Nov. 30, 1948.   B. J. MATTINGLY   2,454,879
FISHING TACKLE
Filed Aug. 16, 1944

Inventor
Benjamin J. Mattingly,
By McMorrow and Berman
Attorneys

Patented Nov. 30, 1948

2,454,879

UNITED STATES PATENT OFFICE 2,454,879

FISHING TACKLE

Benjamin Joseph Mattingly, Center Point, Tex.

Application August 16, 1944, Serial No. 549,692

1 Claim. (Cl. 43—27)

This invention relates to fishing tackle and more particularly to the securing of live bait thereto.

The primary object of this invention is the provision of a simple and efficient means for securing live bait either to a fishing hook, or to a plug, or any other type of fishing tackle without injuring or killing the bait, so that the bait will remain alive and be useful for longer periods of time, thereby eliminating frequent changing of the bait in order to present live bait to be taken by the fish.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which.

Figure 1:
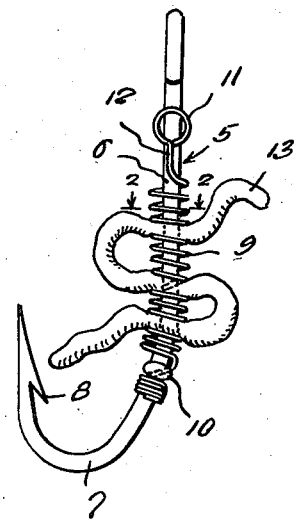
Figure 1 is a side elevation illustrating a fishing hook equipped with a bait securing means constructed in accordance with my invention.
Figure 2:
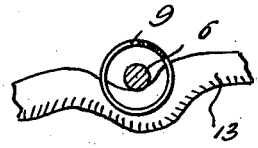
Figure 2 is a sectional view taken on the line 2—2 of Figure 1.

Referring in detail to the drawing, the numeral 5 indicates a conventional type of fishing hook including a shank 6 integral with a hook portion 7 including a barb 8. Heretofore, when using a hook of this kind with live bait it has been customary to shove the barb through the bait in order to secure the latter on the hook portion. This destroys the life of the bait and many fish will not take dead bait, consequently it has been necessary to replace the bait at frequent intervals so that the hook would not be baited with dead bait. To overcome this objection the present invention is adapted to the hook 5 and consists of a coil spring 9 surrounding a portion of the shank 6 and has one end anchored thereto, on an enlarged portion 10, while the opposite end is bent to form a finger piece 11. The finger piece or the shank 12 thereof parallels the shank 6 providing a construction that will permit the finger piece to lie close to the shank 6 of the fishing hook. The finger piece is in fairly close proximity to the shank of the hook so as to enable the operator to press the finger piece against the shank while sliding the finger piece along the shank to facilitate the operation of the spring for insertion of the bait. A pull on the finger piece will bring about spreading of the convolutions of the coil spring so that live bait, indicated at 13, may be readily arranged between selected convolutions of the spring so that when the finger piece 11 is released the coils contracting will grip the bait sufficiently tight enough to prevent its escape from the hook but not tight enough to bring about injury of the bait that would result in death thereof. In a device of this type the operator could hold one or more fingers on the eye of the shank while another finger is manipulating the finger piece along the shank.

A fishing hook of this kind equipped with the present invention may be attached to a fishing line in the usual manner. In the form of my invention, the live bait can be easily and quickly secured in place and prevented from accidental detachment with the assurance that the bait will not be injured as to bring about the death thereof.

While I have shown and described the preferred embodiment of my invention, it will be understood that minor changes in construction, combination and arrangement of parts may be made without departing from the spirit and scope of the invention as claimed.

Having thus described the invention, what I claim is:

In combination with a fishing hook including a shank having an enlarged portion substantially opposite the barb of the hook, a coil spring closely coiled with its lower end portion around the shank below the enlarged portion thereof and loosely surrounding the shank above such enlargement and having its upper end of loop form so as to provide a finger piece for expansion of the convolutions of the spring to permit insertion of live bait between selected convolutions of the spring, said finger piece being in such close proximity to the shank of the hook as to enable the operator to press the finger piece against the shank while sliding the finger piece along the shank.

BENJAMIN JOSEPH MATTINGLY.

REFERENCES CITED

The following references are of record in the file of this patent:

UNITED STATES PATENTS

| Number | Name | Date |
|---|---|---|
| 58,404 | Goodwin | Oct. 2, 1866 |
| 821,544 | Scott | May 22, 1906 |
| 823,319 | Cooper | June 12, 1906 |
| 1,231,165 | Jay | June 26, 1917 |
| 1,851,698 | Fitch | Mar. 29, 1932 |
| 1,863,544 | Prouse | June 14, 1932 |
| 2,080,805 | Brey | May 18, 1937 |
| 2,115,493 | Kosten | Apr. 26, 1938 |
| 2,189,979 | Fender | Feb. 13, 1940 |

FOREIGN PATENTS

| Number | Country | Date |
|---|---|---|
| 369,346 | France | Dec. 29, 1906 |
| 6,810 | Great Britain | Apr. 11, 1900 |